W. BARTHOLOMEW.
LUBRICATING MOUNTING FOR CENTRIFUGAL MACHINES.
APPLICATION FILED SEPT. 15, 1920.
1,432,095. Patented Oct. 17, 1922.
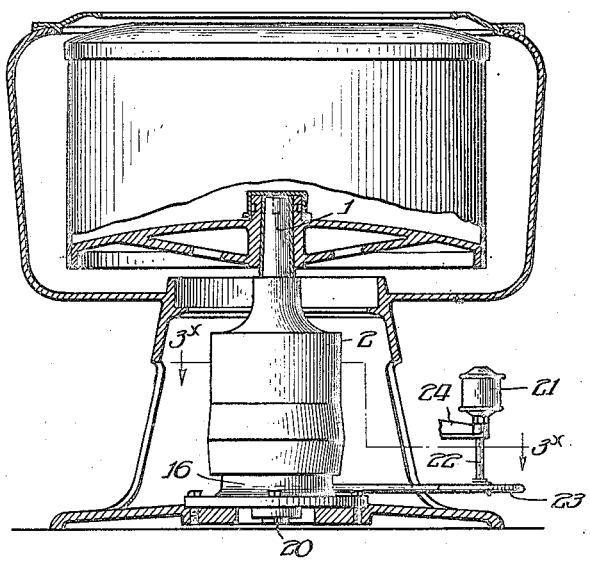
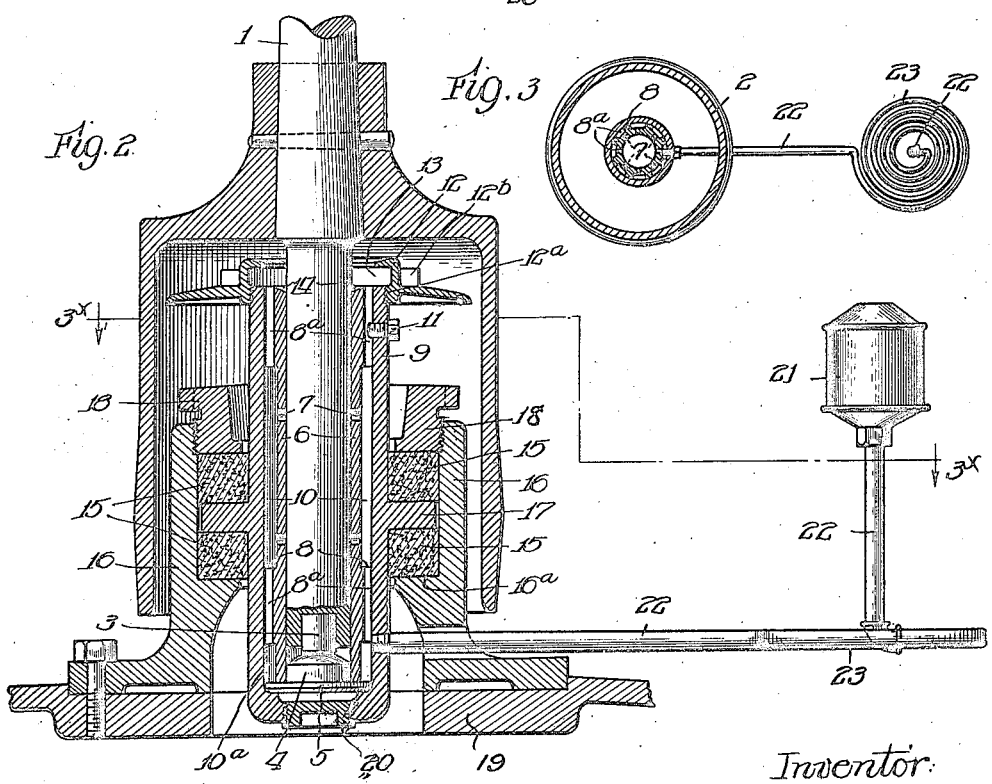
Inventor:
William Bartholomew, Patented Oct. 17, 1922.

1,432,095

UNITED STATES PATENT OFFICE.

WILLIAM BARTHOLOMEW, OF CHICAGO, ILLINOIS, ASSIGNOR TO TROY LAUNDRY MACHINERY CO. LTD., OF CHICAGO, ILLINOIS, A CORPORATION OF NEW YORK.

LUBRICATING MOUNTING FOR CENTRIFUGAL MACHINES.

Application filed September 15, 1920. Serial No. 410,430.

*To all whom it may concern:*

Be it known that I, WILLIAM BARTHOLOMEW, a citizen of the United States, residing at Chicago, in the county of Cook and State of Illinois, have invented certain new and useful Improvements in Lubricating Mountings for Centrifugal Machines, of which the following is a specification.

This invention relates to a bearing for the spindles of centrifugal machines, such, for instance, as water extractors for laundry work, or other types of centrifugal separators, and has for its object to provide for free access of oil to the bearing of the rapidly rotating shaft from an external source of supply, without interfering with the compensating movements which such a bearing must have in the proper operation of a centrifugal machine.

Accordingly, the invention consists in providing a bushing in which the spindle rotates and having radial perforations for admitting oil to the spindle; a spindle bushing housing surrounding the bushing, with a space between them developing an oil reservoir, but centering the bushing immovably within it; a spindle housing cup which presents the housing in upright position but sustains it yieldingly to permit it to compensate for aberration in the revolution of the spindle; and an external lubricator cup connected with the reservoir between the bushing and housing through means of a resilient conduit.

In the accompanying drawing—

Figure 1 is a vertical axial section of an extractor of the type commonly used in laundries, and in which are embodied the several features of the present invention.

Figure 2 is a detail view of the spindle bearing of Figure 1 shown on an enlarged scale; and Figure 3 is a section on the line $3^x$—$3^x$ of Figures 1 and 2, drawn to the scale of Figure 2.

1 represents a spindle which carries a reel shaped pulley 2 depending in position to enclose the lower end of the spindle and the parts in which it is mounted. The spindle is sustained vertically through means of a center shoe 3 with its lower end resting upon the center step 4, which is in turn sustained by the bearing plate 5. Surrounding the spindle is a bushing 6 in which the spindle fits with accuracy and rotates, and this bushing has lubricant ports 7 at suitable points in its cylindrical wall to insure access of lubricant to the spindle. Bushing 6 is provided at its respective ends with radial fins 8, and these fins fit tightly within a housing 9 in a manner to space the bushing from the housing throughout the greater portion of its length and provide a reservoir 10, $10^a$, in which the oil may stand at a level determined by the source of supply, while leaving vertical channels $8^a$ between the radial fins (see particularly Figure 3) to establish communication with said reservoir. The set screw 11 projecting through the wall of housing 9 and into one of the channels $8^a$ prevents rotation of the bushing 6 with the spindle 1. Mounted upon the upper end of the housing 9 is an oil ring 12, conveniently applied thereto through the medium of threads $12^a$ having lugs $12^b$ to receive the spanner wrench for screwing the ring into place, and constructed with an undercut wall which provides an expansion chamber 13 with which the reservoir 10 communicates through the upper set of channels $8^a$.

A trap 14, conveniently provided by reaming the upper end of bushing 6, surrounds the spindle 1 and keeps the supply of oil in position to find its way down into the upper end of the bearing provided by the bushing 6.

The housing 9, which sustains the spindle through the medium of shoe 3, step 4, and bearing plate 5, is itself sustained vertically and laterally by means of a pair of vulcanized rubber rings 15 confined in the housing cup 16 with the radial flange 17 of the housing between them, and with the cup nut 18 threaded in the upper end of the housing cup 16, pressing the column of parts downward upon the supporting ledge $16^a$ of the cup. Lateral contact of the housing 9 is limited to the rubber rings 15, ample provision for necessary lateral play of the housing relatively to the cup and cup nut being made. The cup 16 is supported upon the curb 19, which is preferably left open beneath the housing. The lower end of the housing is closed through the medium of the socket plug 20.

To supply oil to the reservoir 10, $10^a$, within the housing 9, an external oil cup 21 is provided which communicates with said reservoir through the medium of tube 22. As shown in Figure 3, tube 22 is formed into a spiral 23 between the cup 21 and the housing 9, so that the tube may be firmly anchored in an arm or bracket 24 to hold it stationary, and ample flexibility will be developed in the tube to avoid rupturing the communication by oscillation of the housing 9.

I claim:

1. A lubricating mounting for spindles of centrifugal machines, comprising a cup, a housing supported in said cup with freedom of oscillation, a bushing fitted in said housing with a space between the bushing and the housing for the storage of oil, and an external oil supply having flexible connection with said housing.

2. In a lubricating mounting for the spindles of centrifugal machines, a supporting cup, a housing mounted in said cup with freedom of oscillation, a bushing fitted in said housing with a space between the bushing and the housing for the storage of oil, channels leading from said space to the upper end of the housing, an oil ring mounted on the upper end of said housing partaking of the oscillations thereof and providing an expansion chamber in communication with said channels, and means below the level of the oil ring, for supplying oil to the housing.

3. In a lubricating mounting for the spindles of centrifugal machines, the combination of a supporting cup, a housing having a radial flange within said cup, resilient confining rings on opposite sides of said flange within said cup, a bushing within said housing, a spindle having rotary bearing in said bushing, and an external oil supply having flexible connection with said housing.

4. In a mounting for the spindles of centrifugal machines, the combination of a housing, a bushing located in said housing but leaving a space between the bushing and housing for the reception of oil, radial fins upon the bushing fitting the interior of the housing but leaving a vertical channel between them which communicates with said oil space, a spindle having rotary bearing in said bushing, and a set screw inserted through the wall of the housing and entering said channel to prevent rotation of the bushing with the spindle.

5. In a lubricating mounting for the spindles of centrifugal machines, a housing, a bushing in said housing with a space between the bushing and the housing for the reception of lubricant, radial fins on said bushing fitting the interior of the housing but leaving vertical channels between them which communicate with said oil space of the housing, and means for supplying oil to said oil space; said housing having upon its upper end above the level maintained by the oil supply an expansion chamber in communication with said vertical channels.

6. A lubricating mounting for the spindles of centrifugal machines, comprising a housing having a support in which it is mounted, a bearing plate supported in the lower end of said housing, a step supported on said bearing plate, a spindle resting upon said step, and a bushing fitted in said housing and surrounding and providing the rotary bearing for said spindle; said bushing also surrounding said step and positioning it upon said plate.

Signed at Chicago, Illinois, this 7th day of Sept., 1920.

WILLIAM BARTHOLOMEW.